(12) United States Patent
Golan et al.

(10) Patent No.: US 7,577,291 B2
(45) Date of Patent: Aug. 18, 2009

(54) METHOD OF COLOR CORRECTION

(75) Inventors: Asaf Golan, Haifa (IL); Avraham Levy, Kiryat Tivon (IL)

(73) Assignee: Oplus Technologies Ltd., Yokneamillit (IL)

( * ) Notice: Subject to any disclaimer, the term of this patent is extended or adjusted under 35 U.S.C. 154(b) by 966 days.

(21) Appl. No.: 11/072,338

(22) Filed: Mar. 7, 2005

(65) Prior Publication Data

US 2006/0204087 A1 Sep. 14, 2006

(51) Int. Cl.
*G06K 9/00* (2006.01)
(52) U.S. Cl. .................. 382/167; 382/162; 382/274; 382/168; 348/223.1; 345/589; 345/581
(58) Field of Classification Search ............... 382/167, 382/162, 274, 168; 348/223.1, 577; 345/589, 345/581
See application file for complete search history.

(56) References Cited

U.S. PATENT DOCUMENTS

| | | | |
|---|---|---|---|
| 5,384,601 A | 1/1995 | Yamashita | |
| 5,585,860 A | 12/1996 | Takeshima | |
| 6,072,526 A * | 6/2000 | Hashimoto et al. | 348/223.1 |
| 6,259,426 B1 | 7/2001 | Harada et al. | |
| 6,272,239 B1 | 8/2001 | Colla et al. | |
| 6,476,820 B1 | 11/2002 | Harada et al. | |
| 6,678,407 B1 | 1/2004 | Tajima | |
| 6,690,822 B1 * | 2/2004 | Chen et al. | 382/162 |
| 2003/0142879 A1 * | 7/2003 | Kim | 382/274 |
| 2004/0114798 A1 * | 6/2004 | Park et al. | 382/167 |

* cited by examiner

*Primary Examiner*—Vikkram Bali
*Assistant Examiner*—Ali Bayat
(74) *Attorney, Agent, or Firm*—Trop, Pruner & Hu, P.C.

(57) ABSTRACT

A color defined by a chroma point and by a luma value is adjusted by defining a reference chroma point and shifting the chroma point towards the reference point if the chroma point is within a predefined tilted rectangle in the chroma coordinate plane that encloses the reference point; or if the chroma point is within both of two predefined polygons, in the chroma coordinate plane, that enclose the reference point; or if the luma value is within a predefined luma range. Preferably, the two polygons are a rectangle and a rhombus. The chroma point is shifted using a continuous shift function that vanishes on the rectangle and on the rhombus.

18 Claims, 2 Drawing Sheets

METHOD OF COLOR CORRECTION

FIELD AND BACKGROUND OF THE INVENTION

The present invention relates to digital color photography and, more particularly, to a method of adjusting pixel colors to more closely match the expected color of an object depicted in a digital picture.

The human visual system is very sensitive to color shade variations in certain color domains, such as skin colors and sky colors. As a result, when a portion of an image that is supposed to depict skin or sky includes unnatural colors, the color discrepancy is easily detected and causes a degradation in the perceived image quality. It therefore is important to reproduce colors such as skin colors and sky colors with enough fidelity to please the perception of an observer. This task is very demanding when the images concerned are video frames and the required color enhancement, including both detection and correction, must be done in real time. Prior art methods either compromise the accuracy of the detection of unnatural colors or implement complex enhancement algorithms that are computationally too intensive for real time video applications.

Prior art patents and patent applications related to the detection of skin color include:
U.S. Pat. No. 5,585,860 to Takeshima
U.S. Pat. No. 6,072,526 to Hashimoto et al.
U.S. Pat. No. 6,259,426 to Harada et al.
U.S. Pat. No. 6,272,239 to Colla et al.
U.S. Pat. No. 6,476,820 to Harada et al.
U.S. Pat. No. 6,678,407 to Tajima
U.S. Pat. No. 6,690,822 to Chen et al.
US 2003/0142879 to Kim There is less prior art concerning skin tone enhancement. The prior art methods closest to the present invention are those of Yamashita et al., U.S. Pat. No. 5,384,601 and of Park et al., US Published Patent Application No. 2004/0114798. Both of these documents are incorporated by reference for all purposes as if fully set forth herein.

Both the method of Yamashita et al. and the method of Park et al. operate on color expressed in luminance (henceforth, "luma") and chromaticity (henceforth, "chroma") coordinates. Several luma-chroma coordinate systems are known in the art, including the Y-U-V coordinate system, the Y-Pb-Pr coordinate system, the Y-Cb-Cr coordinate system, the L-u-v coordinate system and the L-a-b coordinate system. Yamashita et al. work in the L-u-v coordinate system. Park et al. work in the Y-Cb-Cr coordinate system.

Yamashita et al. define a reference point, in the plane (the "chroma coordinate plane") defined by their two chroma coordinates, as a reference chroma value that represents typical chroma coordinates of skin, and a rectangle in the chroma coordinate plane that encloses the reference point and that spans the portion of the chroma coordinate plane in which the chroma values of image pixels that depict skin are expected to lie. As shown in their FIG. 8, they adjust chroma values of image pixels by moving the corresponding points ("chroma points") in the chroma coordinate plane closer to the reference point. A point in the chroma coordinate plane that coincides with the reference point does not need to be moved at all. Similarly, points that fall on the edges of the rectangle and that fall outside the rectangle are not moved. The extent to which a point inside the rectangle that does not coincide with the reference point is move towards the reference point is a smooth function, of the distances between the point and the nearest edges of the rectangle and between the point and the reference point, that vanishes (i.e., equals zero) for points that fall on the edges of the rectangle or that coincide with the reference point.

Park et al. teach a more accurate method of adjusting chroma values that takes into account both the fact that the region of the chroma coordinate plane within which fall chroma values of image pixels that depict skin is better approximated by a tilted ellipse than by a rectangle and the fact that chroma values that are sufficiently close to the reference value need not be adjusted at all. Park et al. define an outer ellipse in the chroma coordinate plane that spans the region of the plane that is populated by chroma values of pixels that depict skin and an inner ellipse that encloses the chroma values that need not be adjusted. Chroma values of image pixels whose chroma coordinates fall in between the two ellipses are adjusted by moving the corresponding points closer to the inner ellipse. The extent to which a point between the two ellipse is moved is a smooth function, of the distances between that point and the two ellipses, that vanishes on the inner ellipse.

SUMMARY OF THE INVENTION

The method of Park et al. is more accurate than the method of Yamashita et al. but is also much more computationally intensive. The present invention is intermediate between these two prior art methods in computational complexity but is more accurate than even the method of Park et al. The present invention achieves improved accuracy, at little cost in additional computation time over the method of Yamashita et al., by using a single reference point as in Yamashita et al. but by using a definition, of the boundary of the region of the chroma coordinate plane wherein fall chroma values of image pixels that depict skin, that is more flexible than an ellipse. Specifically, the present invention uses a combination of a tilted rectangle and a tilted rhombus that need not be centered on the reference point. In addition, the present invention adjusts only pixels whose luma values fall within the luma range expected for skin, or for sky, or for whatever image feature needs to have its pixel chroma values corrected.

According to the present invention there is provided a method of adjusting a color defined by a chroma point in a chroma coordinate plane and by a luma value, including the steps of: (a) defining a reference point in the chroma coordinate plane; (b) defining a rectangle, in the chroma coordinate plane, that encloses the reference point and that is tilted with respect to coordinate axes of the chroma coordinate plane; and (c) if the chroma point is within the rectangle, shifting the chroma point towards the reference point, using a shift function that vanishes on the rectangle.

According to the present invention there is provided a method of adjusting a color defined by a chroma point in a chroma coordinate plane and by a luma value, including the steps of: (a) defining a reference point in the chroma coordinate plane; (b) defining two overlapping polygons in the chroma coordinate plane, both the polygons enclosing the reference point; and (c) if the chroma point is within both the polygons, shifting the chroma point towards the reference point, using a shift function that vanishes on both the polygons.

According to the present invention there is provided a method of adjusting a color defined by a chroma point in a chroma coordinate plane and by a luma value, including the steps of: (a) defining a reference point in the chroma coordinate plane; (b) defining a luma range; and (c) if the luma value is within the luma range, shifting the chroma point towards the reference point.

According to the present invention there is provided an apparatus for adjusting a color defined by a chroma point in a chroma coordinate plane, including: (a) a memory for storing a reference point in the chroma coordinate plane and a rectangle, in the chroma coordinate plane, that is tilted with respect to coordinate axes of the chroma coordinate plane; and (b) a processor for shifting the chroma point towards the reference point, using a shift function that vanishes on the rectangle, if the chroma point is within the rectangle.

According to the present invention there is provided an apparatus for adjusting a color defined by a chroma point in a chroma coordinate plane, including: (a) a memory for storing a reference point in the chroma coordinate plane and two overlapping polygons, in the chroma coordinate plane, that enclose the reference point; and (b) a processor for shifting the chroma point towards the reference point, using a shift function that vanishes on both the polygons.

According to the present invention there is provided an apparatus for adjusting a color defined by a chroma point in a chroma coordinate plane and by a luma value, including: (a) a memory for storing a reference point in the chroma coordinate plane and a luma range; and (b) a processor for shifting the chroma point towards the reference point if the luma value is within the luma range.

Most generally, the method of the present invention is more than just a compromise between the methods of Yamashita et al. and Park et al. The preferred embodiment of the present invention that is described in detail below is a combination of three basic methods for adjusting a color defined by a chroma point in a chroma coordinate plane and by a luma value.

In all three methods, a reference point is defined in the chroma coordinate plane.

According to the first basic method, a rectangle is defined, in the chroma coordinate plane, that encloses the reference point and that (unlike the square of Yamashita et al.) is tilted with respect to the coordinate axes of the chroma coordinate plane. If (and preferably only if) the chroma point to be adjusted is within the rectangle, the chroma point is shifted towards the reference point using a shift function that vanishes on the rectangle (i.e., on the edges of the rectangle).

Preferably, the shift function is modulated in accordance with the distance of the chroma point from the rectangle (i.e., from the edges of the rectangle).

Preferably, a rhombus is defined, in the chroma coordinate plane, that is parallel to the rectangle and that also encloses the reference point. That the rhombus is "parallel" to the rectangle means that the axes of the rhombus are parallel to the edges of the rectangle. The shift function is defined to vanish outside the rhombus, so that only chroma points that lie within both the rectangle and the rhombus are shifted, and for any of these chroma points, the shift function is modulated in accordance with the distance of the chroma point from the rhombus (i.e., from the edges of the rhombus).

Typically, the rectangle and the rhombus share a common midpoint. Usually, the common midpoint is the reference point.

Preferably, a luma range is defined and the shift function is modulated in accordance with the luma range, so that the shift function vanishes, and the chroma point is not shifted, if the luma value is outside the luma range.

According to the second basic method, two overlapping polygons, rather than only one square as in Yamashita et al., are defined in the chroma coordinate plane. Both polygons enclose the reference point. If (and preferably only if) the chroma point to be adjusted is within both polygons, the chroma point is shifted towards the reference point using a shift function that vanishes on the polygons (i.e., on the edges of the polygons). Preferably, one polygon is a rectangle and the other polygon is a rhombus.

Preferably, the shift function is modulated in accordance with the distance of the chroma point from each polygon (i.e., from the edges of the polygon).

Preferably, a luma range is defined and the shift function is modulated in accordance with the luma range, so that the shift function vanishes, and the chroma point is not shifted, if the luma value is outside the luma range.

According to the third basic method, a luma range is defined, and the chroma point is shifted towards the reference point if (and preferably only if) the luma value is within the luma range. This is in contrast to both Yamashita et al. and Park et al., neither of whom take luma values into account when adjusting chroma values.

Preferably, one or more polygons, that enclose the reference point, are defined in the chroma coordinate plane, and the chroma point is shifted towards the reference point using a shift function that vanishes on and outside the polygon(s), so that the chroma point is shifted towards the reference point only if the chroma point is within (all of) the polygon(s). Most preferably, the shift function is modulated in accordance with the distance of the chroma point from the polygon(s) (i.e., from the edges of the polygon(s)).

According to all three methods, preferably the shift function is a continuous function. Most preferably, the shift function is a cubic function of the coordinates of the chroma point.

To each of the basic methods of the present invention corresponds an apparatus of the present invention that includes a memory for storing the parameters of the method and a processor for implementing the method. In all three cases, the coordinates of the reference point are stored in the memory. The apparatus corresponding to the first basic method also stores the coordinates of the corners of the rectangle in its memory. The apparatus of the second basic invention also stores the coordinates of the vertices of the polygons in its memory. The apparatus of the third basic invention also stores the parameters (at least a lower bound and/or an upper bound) of the luma range in its memory.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method of adjusting the chroma values of image pixels that are interpreted as depicting a specific image feature. Specifically, the present invention can be used to adjust the chroma values of image pixels that depict skin color or skin tone.

The principles and operation of chroma value adjustment according to the present invention may be better understood with reference to the drawings and the accompanying description.

Figure 1:
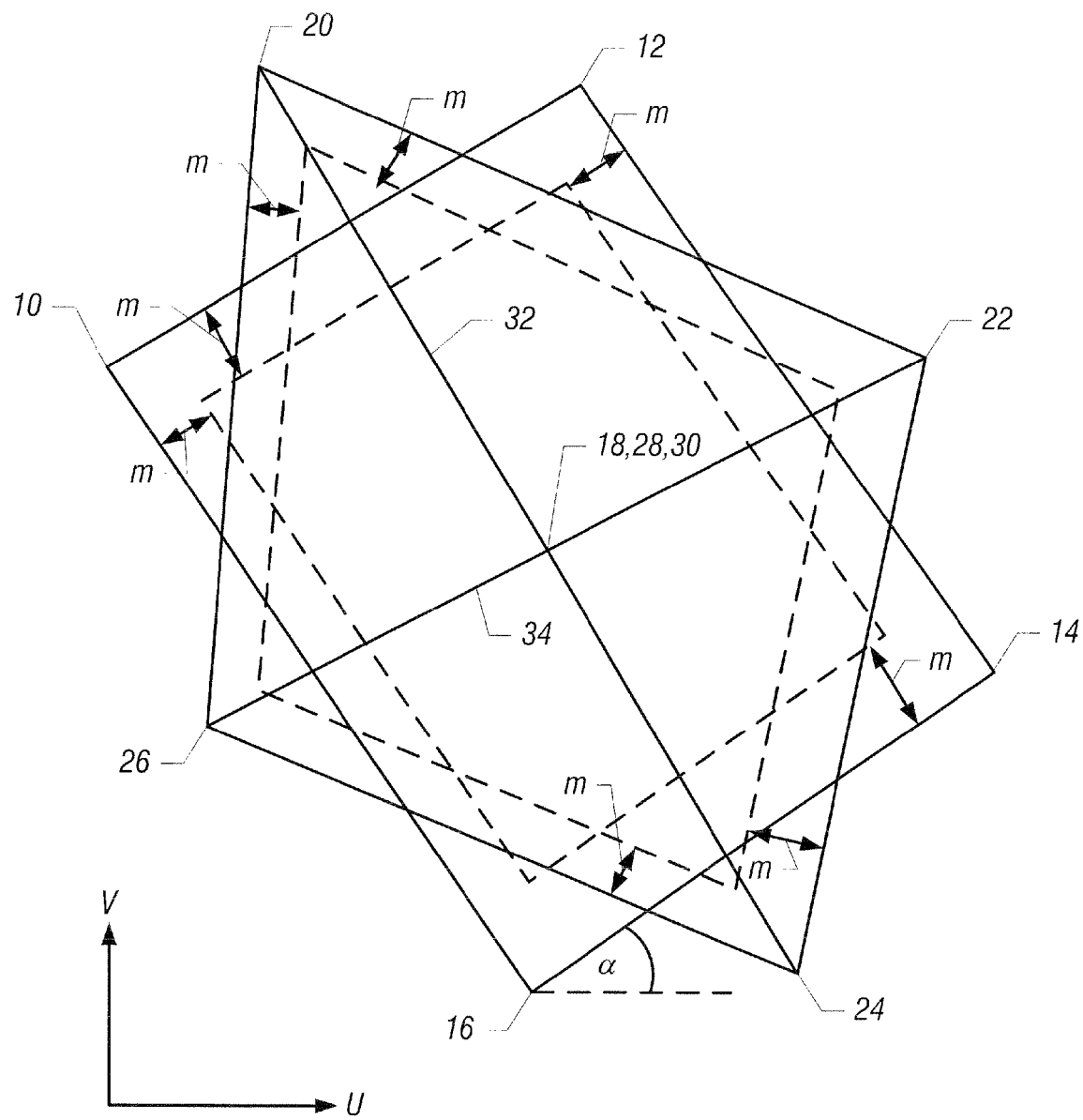
FIG. 1 illustrates geometric parameters of the present invention in the U-V plane.

Referring now to the drawings, FIG. 1 illustrates some of the input parameters of the present invention. Specifically, FIG. 1 shows a portion of the U-V chroma coordinate plane, with the understanding that the Y-U-V coordinate system is used herein as only to illustrate an exemplary embodiment of the present invention. It will be apparent to those skilled in the art how to apply the principles of the present invention to other luma-chroma coordinate systems such as the Y-Pr-Pb coordinate system, the Y-Cr-Cb coordinate system, the L-u-v coordinate system and the L-a-b coordinate system.

FIG. 1 shows an outer rectangle and an outer rhombus in the U-V plane that define the portion of the U-V plane associated with skin tone. The outer rectangle is defined by its corners 10, 12, 14 and 16. The outer rhombus is defined by its corners 20, 22, 24 and 26. The outer rhombus is parallel to the outer rectangle, in the sense that the axes 32 and 34 of the outer rhombus are parallel to the edges of the outer rectangle. The outer rectangle is tilted by an angle $\alpha$ with respect to the U-V coordinate axes. The midpoint 18 of the outer rectangle is at coordinates $(U_{mid}, V_{mid})$. The midpoint 28 of the outer rhombus is at coordinates $(U_{mid}+U_{Rshift}, V_{mid}+V_{Rshift})$. In the present example, midpoint 18 of the outer rectangle coincides with midpoint 28 of the outer rhombus $(U_{Rshift}=V_{Rshift}=0)$, but this is not an obligatory feature of the present invention. Midpoint 28 of the outer rhombus may be anywhere inside the outer rectangle. Half the distance between points 22 and 26 is denoted herein as $R_{ext}$. The ratio of the length of axis 34 to the length of axis 32 is denoted herein as $R_{skew}$. An inner rectangle and an inner rhombus, both denoted by dashed lines, are enclosed by the outer rectangle and the outer rhombus at a distance m from the perimeters of the outer rectangle and the outer rhombus.

Other input parameters of the present invention include:
For luma values, $Y_0$, $Y_1$, $Y_2$ and $Y_3$, that define a luma range.
The coordinates $U_{ref}$ and $V_{ref}$ of a reference chroma point 30. In the present example, reference chroma point 30 coincides with midpoints 18 and 28, but this is not an obligatory feature of the present invention. Reference chroma point 30 may be anywhere inside the outer rectangle and the outer rhombus.
Scaling parameters $U_{coef}$ and $V_{coef}$ for a shift function that is defined below.

The input to the present invention is the coordinates (U,V) of a chroma point in the U-V plane and a luma value Y. The coordinates (U,V) are transformed to a translated and rotated chroma coordinate system whose origin is at midpoint 18 and whose coordinate axes are parallel to the edges of the outer rectangle. In the translated and rotated chroma coordinate system, the coordinates of the input chroma point are $U_{trns}$ and $V_{trns}$, which are defined as follows:

$$U_{trns}=(U-U_{mid})\cos\alpha-(V-V_{mid})\sin\alpha$$

$$V_{trns}=(U-U_{mid})\sin\alpha+(V-V_{mid})\cos\alpha$$

In the translated and rotated chroma coordinate system, the coordinates of the corners of the outer rectangle are:
Point 10: $(U_{min}, V_{max})$
Point 12: $(U_{max}, V_{max})$
Point 14: $(U_{max}, V_{min})$
Point 16: $(U_{min}, V_{min})$
Note that $U_{min}=-U_{max}$ and $V_{min}=-V_{max}$.

The input chroma point is shifted towards reference chroma point 30 if and only if the input chroma point is inside the outer rectangle:

$$U_{min}<U_{trns}<U_{max}; V_{min}<V_{trns}<V_{Max}$$

and the input luma value is inside the luma range:

$$Y_0<Y<Y_3$$

A rectangle modulation function $R_{mod}$ that vanishes outside the outer rectangle, that equals 1 inside the inner rectangle, and that is continuous and linear in-between the two rectangles, is defined as follows:

$$U_{mod}=\min(\min(U_{trns}-U_{min}, U_{max}-U_{trns}),m)/m$$

$$V_{mod}=\min(\min(V_{trns}-V_{min}, V_{max}-V_{trns}),m)/m$$

$$R_{mod}=\min(U_{mod}, V_{mod})$$

A rhombus modulation function $S_{mod}$ that vanishes outside the outer rhombus, that equals 1 inside the inner rhombus, and that is continuous and linear in-between the two rhombuses, is defined as follows:

$$R_{dst}=|U_{trns}-U_{Rshift}\cos\alpha+V_{Rshift}\sin\alpha|+R_{skew}|V_{trns}-U_{Rshift}\sin\alpha-V_{Rshift}\cos\alpha|$$

$$S_{mod}=\min(\max(R_{ext}-R_{dst},0),m)/m$$

Note that the coordinates of the shift of rhombus midpoint 28 relative to rectangle midpoint 18 need to be transformed in to the rotated coordinate system.

A luma modulation function $Y_{mod}$ is defined that vanishes for $Y<Y_0$ and for $Y>Y_3$, that equals 1 for $Y_1<Y<Y_2$, and that is continuous and linear for $Y_0 \leq Y \leq Y_1$ and for $Y_2 \leq Y \leq Y_3$.

The coordinates $U_{trns}$ and $V_{trns}$ are adjusted separately. A U-adjustment function $U_f(U)$ is defined to vanish at $U_{min}$, $U_{ref}$ and $U_{max}$, to be continuous and positive between $U_{min}$ and $U_{ref}$ and to be continuous and negative between $U_{ref}$ and $U_{max}$. A V-adjustment function $V_f(V)$ is defined to vanish at $V_{min}$, $V_{ref}$ and $V_{max}$, to be continuous and positive between $V_{min}$ and $V_{ref}$ and to be continuous and negative between $V_{ref}$ and $V_{max}$. The preferred such functions, for computational efficiency, are cubic for $U_{min} \leq U \leq U_{max}$ and for $V_{min} \leq V \leq V_{max}$, and are linear for $U<U_{min}$, $U>U_{max}$, $V<V_{min}$ and $V>V_{max}$, as follows:

$$U_f = \begin{cases} U & (U < U_{min}) \\ U + U_{coef}(U-U_{min})(U-U_{ref})(U-U_{max}) & (U_{min} \leq U \leq U_{max}) \\ U & (U > U_{max}) \end{cases}$$

$$V_f = \begin{cases} V & (V < V_{min}) \\ V + V_{coef}(V-V_{min})(V-V_{ref})(V-V_{max}) & (V_{min} \leq V \leq V_{max}) \\ V & (V > V_{max}) \end{cases}$$

A total modulation factor M is defined as the minimum of the three modulation functions:

$$M=\min(R_{mod}, S_{mod}, Y_{mod})$$

The total shift function is based on modulating the U- and V-adjustment functions with the total modulation factor M. The resulting output chroma coordinates in the translated and rotated chroma coordinate system are:

$$U_{corr}=U_{trns}+M(U_f(U_{trns})-U_{trns})$$

$$V_{corr}=V_{trns}+M(V_f(V_{trns})-V_{trns})$$

Finally, the output chroma coordinates in the original chroma coordinate system are:

$$U_{adj}=U_{corr}\cos\alpha-V_{corr}\sin\alpha+U_{mid}$$

$$V_{adj}=V_{corr}\cos\alpha+U_{corr}\sin\alpha+V_{mid}$$

The input chroma coordinates (U,V) are replaced with $U_{adj}$, $V_{adj}$).

Figure 2:
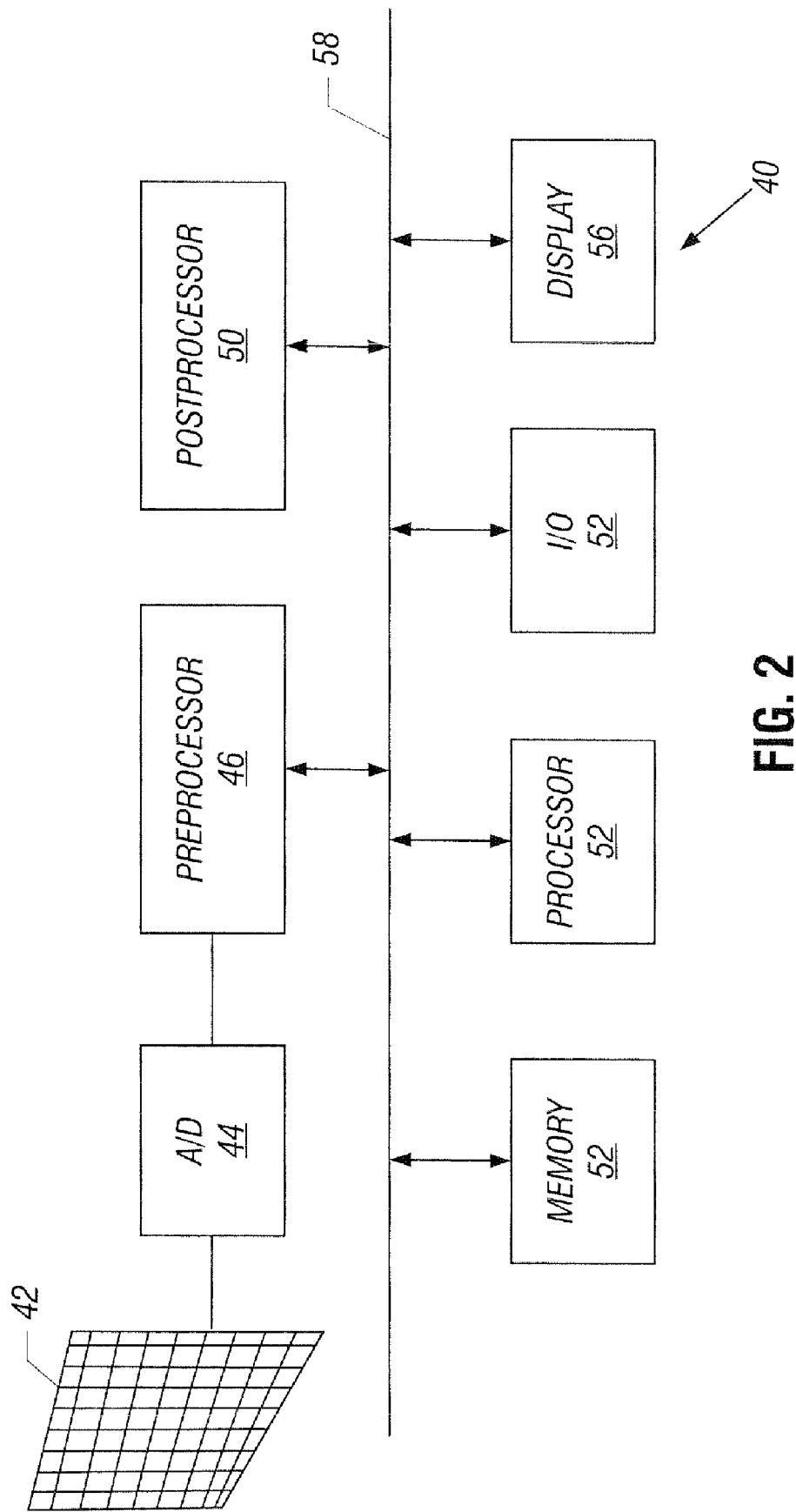
FIG. 2 is a partial high-level block diagram of an apparatus of the present invention.

FIG. 2 is a partial high-level of an exemplary apparatus of the present invention, specifically a video camera 40. Video camera 40 includes a color CCD array 42, an A/D converter 44 and several functional components (a preprocessor 46, a processor 48, a postprocessor 50, several memory devices represented collectively as a memory block 52, an I/O interface 54 such as a USB interface and a display screen 56) that intercommunicate via a system bus 58. Video camera 40 also includes other components, such as optics for focusing light from a scene onto CCD array 42, that are not germane to the present invention and so are not shown in FIG. 2. The memory devices represented collectively by memory block 52 typically include a volatile memory such as a RAM and a nonvolatile memory such as a flash memory device.

Analog signals representing R-G-B values of scene pixels are received from CCD array 42 by A/D converter 44 and converted by A/D converter 44 to digital signals. These R-G-B digital signals are transformed to Y-U-V coordinates by preprocessor 46. The Y-U-V coordinates are stored in the volatile memory of memory block 52. The U and V coordinates are adjusted by processor 48 as described above. The adjusted Y-U-V coordinates are transformed back to the R-G-B representation by postprocessor 50 and are sent to display screen 56 for display and/or to I/O interface 54 for export to a different device such as a personal computer.

The input parameters of the present invention are computed in advance and are stored in the nonvolatile memory of memory block 52. Alternatively, the parameters $Y_0$, $Y_1$, $Y_2$ and $Y_3$ of the luma range are computed dynamically. These parameters sometimes depend on dynamic factors such as the ambient illumination of the scene, and so may not be known in advance. In such a case, processor 48 computes values of $Y_0$, $Y_1$, $Y_2$ and $Y_3$ dynamically, based on histograms of the Y-values of one or more video frames, and stores the computed values of $Y_0$, $Y_1$, $Y_2$ and $Y_3$ in the volatile memory of memory block 52.

The embodiment of an apparatus of the present invention that is illustrated in FIG. 2 is a software-based embodiment, in which the code that processor 48 executes to implement the method of the present invention is stored in the nonvolatile memory of memory block 52. Other embodiments of the apparatus of the present invention include firmware-based and hardware-based embodiments, in which processor 48 is, for example, implemented as a field programmable gate array chip or an application-specific integrated circuit chip that has instructions for implementing the method of the present invention hardwired thereon.

While the invention has been described with respect to a limited number of embodiments, it will be appreciated that many variations, modifications and other applications of the invention may be made.

What is claimed is:

1. A method comprising:
   storing in memory a reference point in a chroma coordinate plane and a rectangle, in the chroma coordinate plane, that is tilted with respect to coordinate axes of the chroma coordinate plane; and
   shifting, using a processor, a chroma point, in the chroma coordinate plane, toward said reference point, using a shift function that vanishes on said rectangle, if the chroma point is within said rectangle.

2. The method of claim 1, wherein said shifting is effected only if the chroma point is within said rectangle.

3. The method of claim 1, further comprising the step of:
   modulating said shift function in accordance with a distance of the chroma point from said rectangle.

4. The method of claim 1, further comprising the steps of:
   defining a rhombus, in the chroma coordinate plane, that is parallel to said rectangle and that encloses said reference point, said shift function vanishing outside said rhombus; and
   if the chroma point is within said rhombus, modulating said shift function in accordance with a distance of the chrome point from said rhombus.

5. The method of claim 4, wherein said rectangle and said rhombus share a common midpoint.

6. The method of claim 5, wherein said common midpoint is said reference point.

7. The method of claim 1, further comprising the steps of:
   defining a luma range; and
   modulating said shift function in accordance with said luma range, such that said shift function vanishes if the luma value is outside said luma range.

8. The method of claim 1, wherein said shift function is continuous.

9. The method of claim 1, wherein said shift function is a cubic function of coordinates of the chroma point.

10. A method comprising:
    storing in an electronic memory, a reference point in a chroma coordinate plane and two overlapping polygons, in the chroma coordinate plane, that enclose said reference point; and
    shifting, using an electronic processor, a chroma point, in said chroma coordinate plane, toward said reference point, using a shift function that vanishes on both said polygons.

11. The method of claim 10, wherein said shifting is effected only if the chroma point is within both said polygons.

12. The method of claim 10, wherein a first said polygon is a rectangle and wherein a second said polygon is a rhombus.

13. The method of claim 10, further comprising the step of:
(d) modulating said shift function in accordance with a distance of the chroma point from each said polygon.

14. The method of claim 10, further comprising the steps of:
    defining a luma range; and
    modulating said shift function in accordance with said luma range, such that said shift function vanishes if the luma value is outside said luma range.

15. The method of claim 10, wherein said shift function is continuous.

16. The method of claim 10, wherein said shift function is a cubic function of coordinates of the chroma point.

17. An apparatus for adjusting a color defined by a chroma point in a chroma coordinate plane, comprising:
    (a) a memory to store a reference point in the chroma coordinate plane and a rectangle, in the chroma coordinate plane, that is tilted with respect to coordinate axes of the chroma coordinate plane; and
    (b) a processor to shift the chroma point towards said reference point, using a shift function that vanishes on said rectangle, if the chroma point is within said rectangle.

18. An apparatus for adjusting a color defined by a chroma point in a chroma coordinate plane, comprising:
    (a) a memory to store a reference point in the chroma coordinate plane and two overlapping polygons, in the chroma coordinate plane, that enclose said reference point; and
    (b) a processor to store the chroma point towards said reference point, using a shift function that vanishes on both said polygons.

* * * * *

UNITED STATES PATENT AND TRADEMARK OFFICE
CERTIFICATE OF CORRECTION

PATENT NO.      : 7,577,291 B2                                    Page 1 of 1
APPLICATION NO. : 11/072338
DATED           : August 18, 2009
INVENTOR(S)     : Golan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1198 days.

Signed and Sealed this

Seventh Day of September, 2010

David J. Kappos
*Director of the United States Patent and Trademark Office*